United States Patent
Guzik et al.

(10) Patent No.: US 9,344,301 B2
(45) Date of Patent: May 17, 2016

(54) ACQUISITION DEVICE WITH MULTISTAGE DIGITAL EQUALIZATION

(71) Applicant: Guzik Technical Enterprises, Mountain View, CA (US)

(72) Inventors: Nahum Guzik, Mountain View, CA (US); Anatoli B. Stein, Atherton, CA (US); Semen P. Volfbeyn, Palo Alto, CA (US); Igor Tarnikov, Palo Alto, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 14/725,535

(22) Filed: May 29, 2015

(65) Prior Publication Data
US 2015/0349983 A1 Dec. 3, 2015

Related U.S. Application Data

(60) Provisional application No. 62/005,487, filed on May 30, 2014.

(51) Int. Cl.
*H04L 25/03* (2006.01)
*H04L 25/06* (2006.01)
*H04B 1/10* (2006.01)

(52) U.S. Cl.
CPC ........ *H04L 25/03044* (2013.01); *H04L 25/066* (2013.01); *H04B 1/10* (2013.01); *H04L 25/03* (2013.01)

(58) Field of Classification Search
CPC ............ H04L 25/03044; H04L 25/066; H04L 25/03057; H04L 25/03; H04B 1/10; H04B 1/0017
See application file for complete search history.

(56) References Cited

U.S. PATENT DOCUMENTS

| | | | | |
|---|---|---|---|---|
| 7,408,495 B2 * | 8/2008 | Stein | ............... | H03M 1/0626 341/120 |
| 8,537,044 B2 * | 9/2013 | Stein | ............... | H03M 1/12 341/120 |
| 8,542,142 B2 * | 9/2013 | Stein | ............... | H03M 1/0626 341/140 |
| 2005/0219091 A1 * | 10/2005 | Wood | ............... | H03M 1/1085 341/120 |
| 2007/0171116 A1 * | 7/2007 | Fuse | ............... | H03M 1/1038 341/161 |

* cited by examiner

*Primary Examiner* — Jean B Corrielus
(74) *Attorney, Agent, or Firm* — Burns & Levinson LLP; Joseph M. Maraia

(57) ABSTRACT

An acquisition device includes an analog to digital converter (ADC) composed of multiple interleaved ADCs (sub-ADCs), which receives an analog signal which is converted to digital form. The digitized signal is processed seriatim by a pre-(or trigger-) equalizer, an acquisition memory and a post-(or memory) equalizer. In a calibration mode, frequency responses of the respective sub-ADCs are determined and trigger coefficients are determined for application to the trigger equalizer to effect a preliminary equalization of the digitized signal sufficient to permit operation of the trigger processor in an acquisition mode. Memory coefficients are determined based on residual frequency responses of the sub-ADCs, for application to the memory equalizer. A trigger processor is responsive to the trigger equalizer to select a subset of samples of the digitized signal for loading to the acquisition memory. The trigger equalizer and a memory equalizer are configured for consecutive operation so that, in an acquisition mode, the memory equalizer receives as its input, a digitized signal from the ADC that has been pre-processed in the trigger equalizer, and the memory equalizer corrects only the residue of misalignments and frequency distortions that remain after the trigger equalizer operation.

12 Claims, 2 Drawing Sheets

ACQUISITION DEVICE WITH MULTISTAGE DIGITAL EQUALIZATION

RELATED APPLICATION(S)

This application claims the benefit of U.S. Provisional Application No. 62/005,487, filed on May 30, 2014, the entire teachings of the above application is incorporated herein by reference.

FIELD OF THE TECHNOLOGY

The present technology relates to triggered acquisition devices, and in particular to acquisition devices with digital equalization.

BACKGROUND

Data acquisition devices are widely used in data processing, communication measurements, digital oscilloscopes and so on. In sampled data systems for those applications, when the sampling rate of the signal processing is high enough, it is not practical to process all samples of an input signal. In that situation, signal processing is generally restricted to segments of the input signal that are of interest for the specific application. Respective groups of samples are selectively positioned around reference points in the input signal, where reference points are determined by detection of particular "trigger events". The groups of samples are initially loaded into an acquisition memory, followed by transfer to a signal processor.

A necessary component of a data acquisition device is an analog to digital converter (ADC). High speed acquisition requires the use of high speed multiple interleaved ADCs (sub-ADCs). To provide for high quality analog to digital conversion, misalignment in frequency responses of the individual sub-ADCs, and frequency distortions of the interleaved ADC as a whole, should be reduced to a minimum, which is achieved by the use of prior art digital equalization (see, for example, U.S. Pat. No. 7,408,495).

A prior art triggered acquisition device with digital equalization (as described, for instance, in US Patent Application Publication No. 2014/0047198) is typically built in accordance with the block diagram shown in FIG. 1. In that figure, an analog input signal is converted to a digital form by an analog to digital converter (ADC) 10. The digital signal from ADC 10 is applied to both an acquisition channel that consists of an acquisition memory 13 and a memory equalizer 14, and a trigger channel that consists of a trigger equalizer 11 and a trigger processor 12. An additional circuit is formed by a calibration unit 15 that consists of a frequency responses measurer 16 and a Fourier transform unit 17. In the block diagram of FIG. 1, the trigger equalizer 11 and trigger processor 12 operate in a real time (RT) mode, whereas the acquisition memory 13 and memory equalizer 14 operate in a not-real time (NRT) mode.

In the trigger channel, the function of the trigger processor 12 is to detect trigger events in the input signal. After a trigger event is detected, the trigger processor 12 produces at its output, corresponding signals that are applied to a control input of the acquisition memory 13. In the acquisition channel, the acquisition memory 13, managed by control signals coming from the trigger processor 12, stores a selected part of the input signal and then outputs that stored signal to be transferred to a processor that operates in a not-real time (NRT) mode.

The frequency responses measurer 16 of calibration unit 15 is responsive to the digital output of ADC 10 and performs measurements of the frequency responses of all individual sub-ADCs contained in interleaved ADC 10. The measured frequency responses, which are used as a basis for calculation of desired frequency responses of the equalizers 11 and 14, are transferred to the Fourier transform unit 17. Fourier transform unit 17 converts the desired frequency responses for the respective equalizers into sets of equalizer coefficients which are loaded into trigger equalizer 11 and memory equalizer 14 respectively.

In the trigger channel, the trigger equalizer 11 carries out equalization of the signal from ADC 10 and applies the equalized signal to the input of trigger processor 12. Trigger equalizer 11 corrects the misalignment in frequency responses of the individual sub-ADCs which are contained in the interleaved ADC 10, as well as the distortions in the frequency response of the ADC 10 as a whole. In a similar way, in the acquisition channel, the memory equalizer 14 corrects signal segments from acquisition memory 13, which are then transferred to an external NRT-mode processor. In this prior art system, the operations of the trigger equalizer 11 and the memory equalizer 14 are both computationally intensive, requiring significant system resources.

A prime consideration in the design of triggered acquisition devices with digital equalization, is given to the problem of reduction of required computation resources. Advances in this direction are hindered, in part, due to the fact that systems of the type illustrated in the block diagram of FIG. 1, possesses a certain redundancy: the trigger equalizer and the memory equalizer operate in parallel, and the equalization results achieved in one of the equalizers are not used in the other equalizer. This redundancy results in inefficiencies in operation, particularly in view of the computational complexity associated with the redundant computations and related processing.

The present technology substantially eliminates the redundancy exemplified in the system of FIG. 1, and similar prior art devices, and effects a significant reduction of required computation resources in a triggered acquisition device with digital equalization.

SUMMARY

The reduction of the resources required in triggered acquisition device with digital equalization is achieved according to the present technology by putting into effect consecutive operation of a trigger equalizer and a memory equalizer. In such a case, the memory equalizer receives as its input, not an ADC output signal, but instead a signal that has in effect been pre-processed in a trigger equalizer. As a result, the memory equalizer does not correct misalignments and frequency distortions of all individual sub-ADCs (as is done in the exemplary system of US Patent Application Publication No. 2014/0047198 and similar systems). Instead, only the residue of misalignments and frequency distortions that remain after trigger equalizer operation is performed. As a result, coefficients of the memory equalizer are calculated based on the characteristics of a tandem connection of the ADC and the trigger equalizer, significantly reducing the resources required in triggered acquisition device with digital equalization.

The acquisition device for multistage digital equalization includes: (a) a composite analog to digital converter (ADC) including a plurality of interleaved sub-ADCs, the ADC having an analog input common to the sub-ADCs, wherein each sub-ADC has an associated sub-ADC output, and wherein each sub-ADC is characterized by an associated frequency response, each sub-ADC being responsive to an analog signal at the analog input, to generate at its associated sub-ADC output, a sequence of digital samples weighted by the associated frequency response of the sub-ADC and otherwise corresponding to instantaneous values of an analog signal at the analog input at a system sampling rate; wherein the frequency responses of the respective sub-ADCs are characterized by mutual misalignments from sub-ADC to sub-ADC, and the composite frequency response of the composite analog to digital converter as a whole is characterized by frequency response distortion; (b) a frequency responses measurer having measurer inputs connected to the respective sub-ADC outputs, and measurements outputs, the measurer being responsive to the respective sub-ADC outputs to measure frequency responses of the respective sub-ADCs and to generate at the respective measurements outputs, measurement signals representative of the frequency responses of the respective sub-ADCs; (c) a pre-equalizer coefficients calculator having pre-equalizer coefficients inputs connected to the respective measurer outputs, and pre-equalizer coefficients outputs connected to the pre-equalizer coefficients inputs, wherein the pre-equalizer coefficients calculator is responsive to the measurer outputs to generate the pre-equalizer coefficients at the pre-equalizer coefficients outputs; wherein the pre-equalizer coefficients are determined for effecting partial reduction of misalignments of the respective sub-ADC outputs and partial reduction of frequency response distortion associated with the composite analog to digital converter as a whole; and (d) a pre-equalizer having pre-equalizer inputs connected to the respective sub-ADC outputs of the composite analog to digital converter, pre-equalizer coefficients inputs for receiving pre-equalizer coefficients, and pre-equalizer outputs, wherein the pre-equalizer is responsive to the respective sub-ADC outputs and the pre-equalizer coefficients, to generate at the pre-equalizer outputs, pre-equalized signals including components corresponding to the respective sub-ADC outputs wherein the components are characterized by the partial reduced misalignments with respect to the respective sub-ADC outputs, and the partial reduced frequency response distortion relative the frequency response distortion associated with the composite analog to digital converter as a whole.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 2:
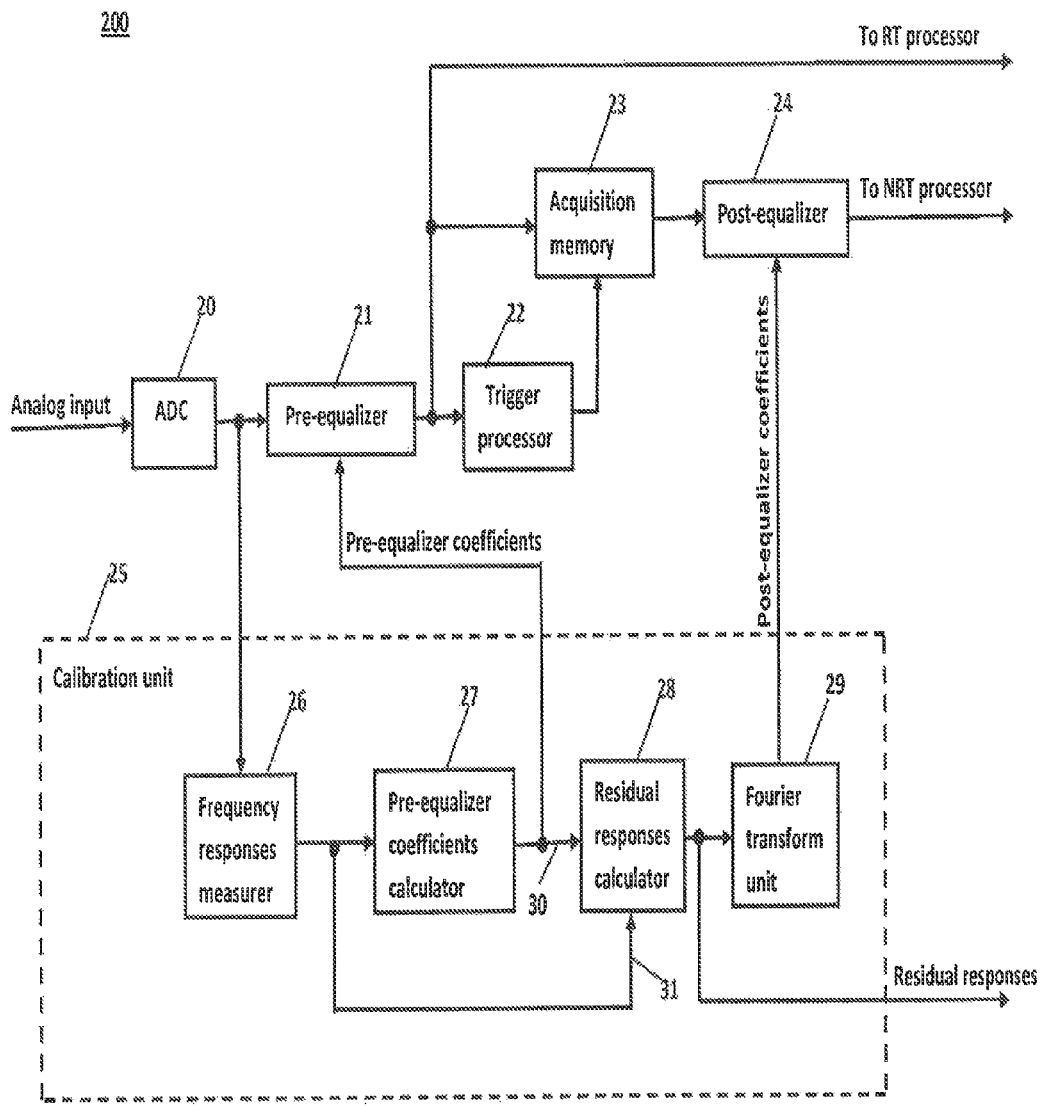
FIG. 2 shows, in block diagram form, a triggered acquisition device with digital equalization according to the present technology.

An exemplary triggered acquisition device 200 with digital equalization according to the present technology is shown in FIG. 2. Triggered acquisition device 200 includes an analog to digital converter (ADC) 20 adapted to receive an analog input signal which is converted to a digital form by ADC 20.

Generally, ADC 20 is composed of high speed multiple interleaved ADCs (sub-ADCs). The digital output signal from ADC 20 is coupled to an input of a pre-equalizer 21 and an input of a calibration unit 25. An output of pre-equalizer 21 provides an output signal for a real time (RT) processor, and also is coupled to an input of a trigger processor 22 and an acquisition memory 23. An output of trigger processor 21 is coupled to a control input of acquisition memory 23. An output of acquisition memory 23 is coupled to a post-equalizer 24, which in turn provides an output signal for a not-real time (NRT) processor. The calibration unit 25 includes serially coupled frequency responses measurer 26, pre-equalizer coefficients calculator 27, residual responses calculator 28 and Fourier transform unit 29. An output of frequency responses measurer 26 is coupled to an input of pre-equalizer coefficients calculator 27 and to a control input of residual responses calculator 28. An output of pre-equalizer coefficients calculator 27 is coupled to an input of residual responses calculator 28 and to a coefficient input of pre-equalizer 21. An output of residual responses calculator 28 is coupled to an input of Fourier transform unit 29. An output of Fourier transform unit 29 is applied to a post-equalizer coefficients input of post-equalizer 24.

In operation of the exemplary triggered acquisition device 200, an analog signal applied to ADC 20 is transformed by ADC 20 into a sequence of digital samples corresponding to the instantaneous values of the input signal at a system sample rate. The system 200 may be considered as having three functional parts: (1) a part that comprises pre-equalizer 21 with trigger processor 22, which detects trigger events in the input signal and produces control signals for data acquisition management, (2) a part that comprises acquisition memory 23 with post-equalizer 24, which stores the selected segments of the input signal and prepares them for transfer to an NRT processor, and (3) a calibration unit 25 that measures the frequency responses of all individual sub-ADCs contained in interleaved ADC 20, and produces sets of coefficients both for pre-equalizer 21 and post-equalizer 24.

Figure 1:
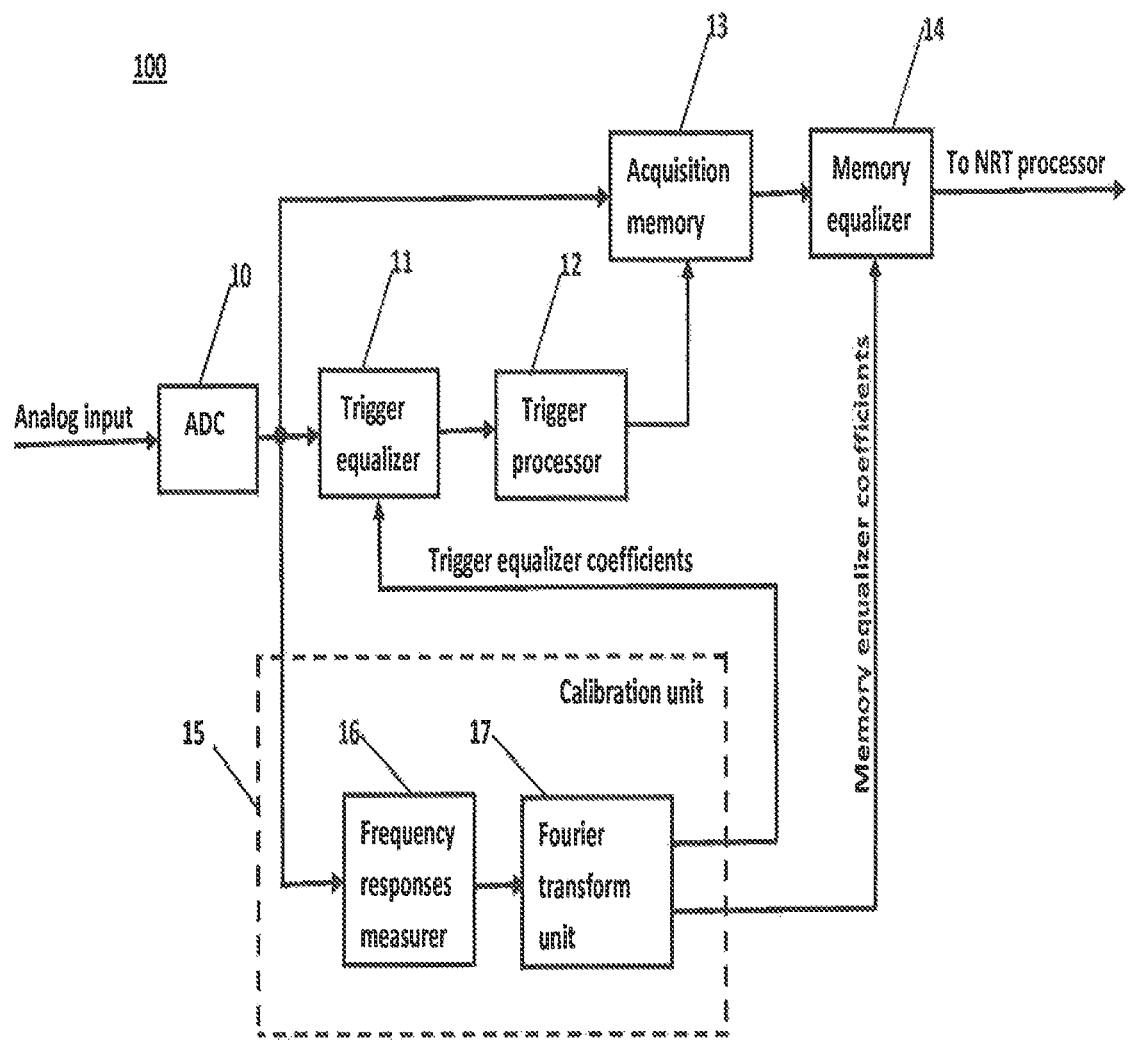
FIG. 1 shows, in block diagram form, a triggered acquisition device with digital equalization according to the prior art.

A principal difference between the block diagram of acquisition device 200 of FIG. 2 and the block diagram of acquisition device 100 of FIG. 1, is the interaction, or not, of the incorporated equalizers of the respective acquisition devices 100 and 200. In acquisition device 100 of FIG. 1, equalizers 11 and 14 are connected in parallel and operate independently. Each of equalizer s 11 and 14 receives as its inputs, a digital signal generated by ADC 10, and has to correct distortions inherent to the interleaved ADC 10. In contrast, in acquisition device 200 of FIG. 2, the pre-equalizer 21, operating in real time mode, carries out preliminary equalization of the input signal that is sufficient to provide for proper operation of the trigger processor 22. The post-equalizer 24 operates in a not-real time mode. Post-equalizer 24 receives as an input signal, the signal produced by the pre-equalizer 21 (after a passage through the acquisition memory 23). Distortions in that signal have already been partially corrected by the pre-equalizer 21. Therefore, the post-equalizer 24 has to correct only residual distortions that are left over after the equalization by pre-equalizer 21. In such a manner, an opportunity to shorten the post-equalizer length is realized with a corresponding reduction of required computing resources.

The frequency responses measurer 26 receives the digital signal from the output of ADC 20. In cooperation with a sine wave generator connected to the input of ADC 20 (not shown In the FIG. 2), the frequency responses measurer 26 measures frequency responses of all of the interleaved individual sub-ADCs incorporated in ADC 20, and places the measurement results at its output. The pre-equalizer coefficients calculator 27 uses the measured frequency responses to determine misalignments between different interleaved individual sub-ADCs, and the deviation of ADC frequency responses as a whole, from the target frequency responses. Then, pre-equalizer coefficients calculator 27 calculates the required frequency responses for the pre-equalizer 21, and determines desired pre-equalizer coefficients by applying a direct Fourier transform to the required frequency responses.

Since the post-equalizer 24 does not have to correct all the distortions inherent to the interleaved ADC, but only residual distortions that are left over after the first stage of equalization, the calculation procedure of post-equalizer coefficients is modified, compared to the calculations performed in prior art systems of the type shown in FIG. 1.

More particularly, each of individual sub-ADCs that are contained in the ADC 20, may be described by a frequency response H[i, nFrq], where H[i, F] is a complex valued function of the individual sub-ADC with the number i and of the frequency F used in the measurement. When a signal $x[t]=\exp(j2\pi Ft)$ is applied to the input of ADC 20, then the individual sub-ADC with number i produces a signal $H[i, F] \cdot \exp(j2\pi Ft)$. The signal y[n] at the output of ADC 20 equals the output of the individual sub-ADC with number $i=n(\bmod N)$, where N is the number of individual sub-ADCs in the interleaved ADC 20: $y[n]=H[n(\bmod N), F] \cdot \exp(j2\pi Fn)$. The number n of the current sampling interval equals the time t multiplied by the sampling frequency Fs.

A signal z[n] at the output of pre-equalizer 21 equals a convolution of the pre-equalizer input signal y[n] with the coefficients sets C[i, m], where I, as before, is the number of individual sub-ADC which is active in the current time step, m is the number of a coefficient in the corresponding coefficients set and L is the length of pre-equalizer 21:

$$z[n] = \sum_{m=0}^{L-1} C[(n-m)(\bmod N), m] \cdot y[n-m]$$

$$= \sum_{m=0}^{L-1} C[(n-m)(\bmod N), m] \cdot H[(n-m)(\bmod N), F] \cdot \exp(j2\pi F(n-m))$$

$$= \exp(j2\pi Fn) \cdot \sum_{m=0}^{L-1} C[(n-m)(\bmod N), m] \cdot H[(n-m)(\bmod N), F] \cdot \exp(j2\pi F(-m)).$$

The last expression shows that the cascade connection of ADC 20 and pre-equalizer 21 may be considered as a time variable device, where the frequency response is varied at each sampling interval and, at n-th sampling interval, equals:

$$H_{cascade}[n, F] = \sum_{m=0}^{L-1} C[(n-m)(\bmod N), m] \cdot H[(n-m)(\bmod N), F] \cdot \exp(j2\pi F(-m)). (*)$$

The last equation is used as a basis for calculations of coefficients of the post-equalizer 24. These calculations are performed by a post-equalizer coefficients calculator, which comprises residual response calculator 28 and Fourier transform unit 29. At its responses input 31, the residual response calculator 28 receives from the frequency responses measurer 26, the frequency responses H[i, F] for all individual sub-ADCs. At its coefficients input 30, the residual response calculator 28 receives from the pre-equalizer coefficients calculator 27, the coefficients C(i, m) of the pre-equalizer 21. The input data are used by computing means of the residual response calculator 28 to determine the frequency response Hcascade[n, F] of the cascade connection of the ADC 20 and the pre-equalizer 21 in accordance with the equation (*). Then, the residual response calculator 28 uses the frequency response Hcascade[n, F] to determine misalignment and frequency distortions in the signal at the output of the pre-equalizer 21. An inversion operation transforms the results of the foregoing step of calculations into the required frequency responses of the post-equalizer 24.

The required frequency responses of the post-equalizer 24 determined in the residual response calculator 28, are transmitted to the input of the Fourier transform unit 29 where the coefficients of the post-equalizer 24 are calculated. The Fourier transform unit 29 produces a post-equalizer set of coefficients corresponding to a direct Fourier transform of the required frequency responses of the post-equalizer 24 received at its Fourier transform inputs from the residual response calculator 28. The so-determined sets of coefficients are loaded into coefficients memory of the post-equalizer 24.

The exemplary triggered acquisition device 200 is selectively operable in two modes: a calibration mode, and an acquisition mode. When switched into the calibration mode, the acquisition device 200 performs measurement of the ADC frequency responses and transforms the resultant measurements into coefficient sets for pre-equalizer 21 and post-equalizer 24, as described above. The calibration mode ends by loading the respective calculated sets of coefficients into a coefficients memory of the pre-equalizer 21 and a coefficients memory of the post-equalizer 24. After calibration is finished, the acquisition device 200 switches to the acquisition mode.

In the acquisition mode, a preliminary equalization of the digital signal produced by ADC 20 is performed by the pre-equalizer 21, using the coefficients determined and loaded in the calibration mode. The joint operation of the trigger processor 22 and the acquisition memory 23 compress the input signal, retaining only the parts that are essential for subsequent processing. The signal from the output of acquisition memory 23 undergoes a final equalization in the post-equalizer 24, again using the coefficients determined and loaded in the calibration mode, and is transferred out of the acquisition device 200 by way of the output that is labeled "To NRT processor" in FIG. 2.

In the above-described operation of the exemplary triggered acquisition device 200, the signal processing uses selected samples of the input signal rather than all samples of the entire signal. Triggered acquisition device 200 is also operative in applications where the signal processing that is performed in a real time mode using all samples of the input signal. Such operations do not impose stringent requirements on the correction of frequency responses acquisition device 200, allowing equalization by the pre-equalizer 21 only. To enable a real time (RT) processor to carry out the latter kind of operation using acquisition device 200 as illustrated in FIG. 2, an additional output line, labeled "To RT processor", is provided, extending from the output of the pre-equalizer 21 of acquisition device 200.

In some cases, an external not-real time (NRT) processor which receives the signal produced by the acquisition device 200 by way of the "To NRT processor" line, uses its own computing resources for achieving more accurate equalization. To carry out the latter kind of operation using acquisition device 200 as illustrated in FIG. 2, an additional output line, labeled "To NRT processor", is provided, extending from the output of the residual response calculator 28 of acquisition device 200, enabling calculation of the additional equalization coefficients in the NRT processor.

One skilled in the art will realize the technology may be embodied in other specific forms without departing from the spirit or essential characteristics thereof. The foregoing embodiments are therefore to be considered in all respects illustrative rather than limiting of the technology described herein. The scope of the technology is thus indicated by the appended claims, rather than by the foregoing description, and all changes that come within the meaning and range of equivalency of the claims are therefore intended to be embraced therein.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An acquisition device for multistage digital equalization comprising;
  A. a composite analog to digital converter (ADC) including a plurality of interleaved sub-ADCs, the ADC having an analog input common to the sub-ADCs, wherein each sub-ADC has an associated sub-ADC output, and wherein each sub-ADC is characterized by an associated frequency response, each sub-ADC being responsive to an analog signal at the analog input, to generate at its associated sub-ADC output, a sequence of digital samples weighted by the associated frequency response of the sub-ADC and otherwise corresponding to instantaneous values of the analog signal at the analog input at a system sampling rate;
    wherein the frequency responses of the respective sub-ADCs are characterized by mutual misalignments from sub-ADC to sub-ADC, and a composite frequency response of the composite analog to digital converter as a whole is characterized by frequency response distortion;
  B. a frequency responses measurer having measurer inputs connected to the respective sub-ADC outputs, and measurements outputs, the measurer being responsive to the respective sub-ADC outputs to measure the frequency responses of the respective sub-ADCs and to generate at the respective measurements outputs, measurement signals representative of the frequency responses of the respective sub-ADCs;
  C. a pre-equalizer coefficients calculator having pre-equalizer coefficients inputs connected to the respective measurer outputs, and pre-equalizer coefficients outputs wherein the pre-equalizer coefficients calculator is responsive to the measurer outputs to generate pre-equalizer coefficients at the pre-equalizer coefficients outputs;
    wherein the pro-equalizer coefficients are determined for effecting partial reduction of misalignments of the respective sub-ADC outputs and partial reduction of frequency response distortion associated with the composite analog to digital converter as a whole; and
  D. a pre-equalizer having pre-equalizer inputs connected to the respective sub-ADC outputs of the composite analog to digital converter, pre-equalizer coefficients inputs for receiving the pre-equalizer coefficients from the pro-equalizer coefficient outputs of the pre-equalizer coefficients calculator, and pre-equalizer outputs, wherein the pre-equalizer is responsive to the respective sub-ADC outputs and the pre-equalizer coefficients, to generate at the pre-equalizer outputs, pre-equalized signals including components corresponding to the respective sub-ADC outputs wherein the components are characterized by the partial reduced misalignments with respect to the respective sub-ADC outputs, and the partial reduced frequency response distortion relative the frequency response distortion associated with the composite analog to digital converter as a whole.

2. An acquisition device according to claim 1, further comprising:
  E. a trigger processor having a trigger processor input connected to the pre-equalizer outputs, and a trigger output, wherein the trigger processor is responsive to the pre-equalizer outputs, to detect predetermined trigger events at the pre-equalizer outputs and in response thereto, generate a trigger control signal at the trigger output; and
  F. an acquisition memory having memory inputs connected to the respective pre-equalizer outputs, a control input connected to the trigger output, and memory outputs, wherein the acquisition memory is responsive to the pre equalizer outputs and the trigger control signal to:
    (i) continuously accumulate digital samples of the pre-equalizer outputs over a pre-trigger acquisition interval commencing at a pro-trigger acquisition interval start time, and terminating at a post-trigger acquisition interval end time
    (ii) unload the accumulated digital samples at the memory outputs over an unloading interval commencing at an unload interval start time after the post-trigger acquisition interval end time and terminating at an unload interval end time, and
    (iii) resume continuous accumulation of digital samples pursuant to sub-step (i) after the termination of the unloading interval; and
  G. a post-equalizer coefficients calculator having first post-equalizer coefficients inputs connected to the respective pre-equalizer coefficients outputs, and a second post-equalizer coefficients input connected to the measurer outputs, and post-equalizer coefficients outputs, wherein the post-equalizer coefficients calculator is responsive to the pre-equalizer coefficients and the measurements outputs, to calculate and provide at the post-equalizer coefficients outputs, the post-equalizer coefficients;
    wherein the post-equalizer coefficients are determined for effecting reduction of residual misalignments of the respective sub-ADC outputs beyond the partial reduction and reduction of residual frequency response distortion associated with the composite analog to digital converter as a whole beyond the partial reduction;
  H. a post-equalizer having first post-equalizer inputs connected to the respective memory outputs, second post-equalizer coefficients inputs and post equalizer outputs, wherein the post-equalizer is responsive to the memory outputs applied to the first post-equalizer coefficients inputs and post-equalizer coefficients applied to the second post-equalizer coefficients inputs, to provide at the post-equalizer outputs, an output characterized by digital equalization of the accumulated digital samples at the memory outputs thereby reducing residual misalignments therebetween, and reducing residual frequency response distortions associated with the composite analog to digital converter as a whole.

3. An acquisition device according to claim 2, wherein the pre-equalizer is operative in real time, and the post-equalizer is operative in not-real time.

4. An acquisition device according to claim 2, wherein the post-equalizer coefficients calculator comprises:
G1. a residual responses calculator having a first input being a first input of the post-equalizer coefficients calculator, a second input being a second input of the post-equalizer coefficients calculator, and an output, wherein the residual responses calculator is adapted to:
  (i) determine frequency responses of a cascade connection of the sub-ADCs and the pre-equalizer,
  (ii) calculate residual misalignment distortions and residual deviations from target frequency responses, using the determined cascade connection frequency responses, and
  (iii) calculate required frequency responses of the post-equalizer based on a residue evaluation; and
G2. a Fourier transform unit having transform inputs connected to the outputs of the residual responses calculator and transform outputs connected to the outputs of the post-equalizer coefficients calculator, wherein the Fourier transform unit produces a post-equalizer set of coefficients corresponding to a direct Fourier transform of the required frequency responses of the post-equalizer received at the transform inputs.

5. An acquisition device according to claim 4, wherein the residual responses calculator comprises:
a computer adapted to determine the frequency responses of a cascade connection of the sub-ADCs and the pre-equalizer in accordance with $$H_{cascade}[n, F] = \sum_{m=0}^{L-1} C[(n-m)(\text{mod } N), m] \cdot H[(n-m)(\text{mod } N), F] \cdot \exp(j2\pi F(-m)),$$

where $H[i, F]$ is a complex valued function of the individual sub-ADC with the number i, C are convolution coefficients, F is the sampling frequency in the respective sub-ADC, N is the number of interleaved sub-ADC in the composite analog to digital converter, L is the length of the pre-equalizer, n is the number of the current sampling interval, and m is the number of a coefficient in the corresponding coefficients set $C[i, m]$.

6. An acquisition device according to claim 1,
wherein said acquisition device further includes real time (RT) processor outputs connected to the respective outputs of the pre-equalizer.

7. An acquisition device according to claim 4,
wherein said acquisition device further includes residual responses outputs connected to the respective outputs of the residual responses calculator.

8. An acquisition device for multistage digital equalization comprising:
A. a composite analog to digital converter (ADC) including a plurality of interleaved sub-ADCs, the ADC having an analog input common to the sub ADCs, wherein each sub-ADC has an associated sub-ADC output, and wherein each sub-ADC is characterized by an associated frequency response, wherein each sub-ADC is responsive to an analog signal at the analog input, to generate at sub-ADC outputs, a sequence of digital samples weighted by the associated frequency response of the sub-ADC and otherwise corresponding to instantaneous values of the analog signal at the analog input at a system sampling rate;
  wherein the frequency responses of the respective sub-ADCs are characterized by mutual misalignments from sub-ADC to sub-ADC, and a composite frequency response of the composite analog to digital converter as a whole is characterized by frequency response distortion;
B. a frequency responses measurer responsive to the respective sub-ADC outputs to measure the frequency responses of the respective sub-ADCs and to generate measurement signals representative of the frequency responses of the respective sub-ADCs;
C. a pre-equalizer coefficients calculator responsive to the measurer outputs to generate the pre-equalizer coefficients;
  wherein the pre-equalizer coefficients are determined for effecting partial reduction of misalignments of the respective sub-ADC outputs and partial reduction of frequency response distortion associated with the composite analog to digital converter as a whole; and
D. a pre-equalizer responsive to the respective sub-ADC outputs and the pre-equalizer coefficients, to generate pre-equalized signals including components corresponding to the respective sub-ADC outputs wherein the components are characterized by the partial reduced misalignments with respect to the respective sub-ADC outputs, and the partial reduced frequency response distortion relative the frequency response distortion associated with the composite analog to digital converter as a whole.

9. An acquisition device according to claim 8, further comprising:
E. a trigger processor responsive to the pre-equalizer signals, to detect predetermined trigger events at the pre-equalizer and in response thereto, generate a trigger control signal; and
F. an acquisition memory responsive to the pre-equalizer signals and the trigger control signal to:
  i. continuously accumulate digital samples of the pre-equalizer signals over a pre-trigger acquisition interval commencing at a pre-trigger acquisition interval start time, and terminating at a post-trigger acquisition interval end time;
  ii. unload the accumulated digital samples from the memory over an unloading interval commencing at an unload interval start time after the post-trigger acquisition interval end time and terminating at an unload interval end time, and
  iii. resume continuous accumulation of digital samples pursuant to sub-step i after the termination of the unloading interval; and
G. a post-equalizer coefficients calculator responsive to the pre-equalizer coefficients and the frequency response measurements, to calculate and provide, the post-equalizer coefficients;
  wherein the post-equalizer coefficients are determined for effecting reduction of residual misalignments of the respective sub-ADC outputs beyond the partial reduction and reduction of residual frequency response distortion associated with the composite analog to digital converter as a whole beyond the partial reduction;
H. a post-equalizer responsive to the memory outputs and post-equalizer coefficients outputs to perform digital equalization to the accumulated digital samples at the memory outputs thereby reducing residual misalignments therebetween, and reducing residual frequency response distortions associated with the composite analog to digital converter as a whole.

10. An acquisition device according to claim 9, wherein the pre-equalizer is operative in real time, and the post-equalizer is operative in not-real time.

11. An acquisition device according to claim 9, wherein the post-equalizer coefficients calculator comprises:
G1. a residual responses calculator having a first input being a first input of the post-equalizer coefficients calculator, a second input being a second input of the post-equalizer coefficients calculator, and an output, wherein the residual responses calculator is adapted to:
   (i) determine frequency responses of a cascade connection of the sub-ADCs and the pre-equalizer,
   (ii) calculate residual misalignment distortions and residual deviations from target frequency responses, using the determined cascade connection frequency responses, and
   (iii) calculate required frequency responses of the post-equalizer based on a residue evaluation; and
G2. a Fourier transform unit, wherein the Fourier transform unit produces a post-equalizer set of coefficients corresponding to a direct Fourier transform of the required frequency responses of the post-equalizer received at the transform inputs.

12. An acquisition device according to claim 11, wherein the residual responses calculator comprises:
a computer adapted to determine the frequency responses of a cascade connection of the sub-ADCs and the pre-equalizer in accordance with:

$$H_{cascade}[n, F] = \sum_{m=0}^{L-1} C[(n-m)(\bmod N), m] \cdot H[(n-m)(\bmod N), F] \cdot \exp(j2\pi F(-m)),$$

where $H[i, F]$ is a complex valued function of the individual sub-ADC with the number i, C are convolution coefficients, F is the sampling frequency in the respective sub-ADC, N is the number of interleaved sub-ADC in the composite analog to digital converter, L is the length of the pre-equalizer, n is the number of the current sampling interval, and m is the number of a coefficient in the corresponding coefficients set $C[i, m]$.

* * * * *